United States Patent
Yamamoto

(10) Patent No.: US 10,682,864 B2
(45) Date of Patent: Jun. 16, 2020

(54) INK-JET IMAGE FORMING DEVICE

(71) Applicant: Konica Minolta Inc., Chiyoda-ku, Tokyo (JP)

(72) Inventor: Ryoichi Yamamoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/359,251

(22) Filed: Mar. 20, 2019

(65) Prior Publication Data
US 2019/0291457 A1    Sep. 26, 2019

(30) Foreign Application Priority Data
Mar. 22, 2018    (JP) ................ 2018-054162

(51) Int. Cl.
| | | |
|---|---|---|
| B41J 2/175 | (2006.01) | |
| B41J 2/19 | (2006.01) | |
| B01D 19/00 | (2006.01) | |
| B41J 2/18 | (2006.01) | |
| B41J 2/01 | (2006.01) | |

(52) U.S. Cl.
CPC .......... *B41J 2/19* (2013.01); *B01D 19/00* (2013.01); *B41J 2/01* (2013.01); *B41J 2/175* (2013.01); *B41J 2/18* (2013.01)

(58) Field of Classification Search
CPC ....... B41J 2/01; B41J 2/175; B41J 2/18; B41J 2/19; B01D 19/00
See application file for complete search history.

(56) References Cited

U.S. PATENT DOCUMENTS

| | | | | |
|---|---|---|---|---|
| 2,008,007 | A * | 7/1935 | Dreffein .................. | G05D 23/22 236/15 R |
| 6,059,405 | A * | 5/2000 | Mochizuki ............ | B41J 2/17509 347/92 |
| 8,128,214 | B2 * | 3/2012 | Fujimori .............. | B41J 2/17506 347/84 |
| 9,393,803 | B2 * | 7/2016 | Ando ........................ | B41J 2/19 |
| 2008/0273063 | A1 * | 11/2008 | Wouters ................. | B41J 2/1707 347/85 |

FOREIGN PATENT DOCUMENTS

| | | |
|---|---|---|
| JP | 2011207017 A | 10/2011 |
| JP | 2015058656 A | 3/2015 |
| WO | 2015125521 A1 | 8/2015 |
| WO | 2016098536 A1 | 6/2016 |

\* cited by examiner

*Primary Examiner* — Anh T Vo
(74) *Attorney, Agent, or Firm* — Cantor Colburn LLP

(57) ABSTRACT

An ink-jet image forming device includes: an ink flow path; a degassing unit provided in the middle of the ink flow path including a gas-permeable degassing membrane one surface of which is brought into contact with ink in the ink flow path; a vacuum sucker that evacuates the degassing unit; and a vacuum path connecting the vacuum sucker and the degassing unit, wherein the vacuum path is arranged so as to evacuate on a surface side opposite to a surface side brought into contact with the ink of the degassing membrane in the degassing unit, a storage space for storing an inflow flowing into the degassing membrane and the vacuum path is included in the middle of the vacuum path, and the storage space may be maintained at a raised temperature by a heat source.

14 Claims, 5 Drawing Sheets

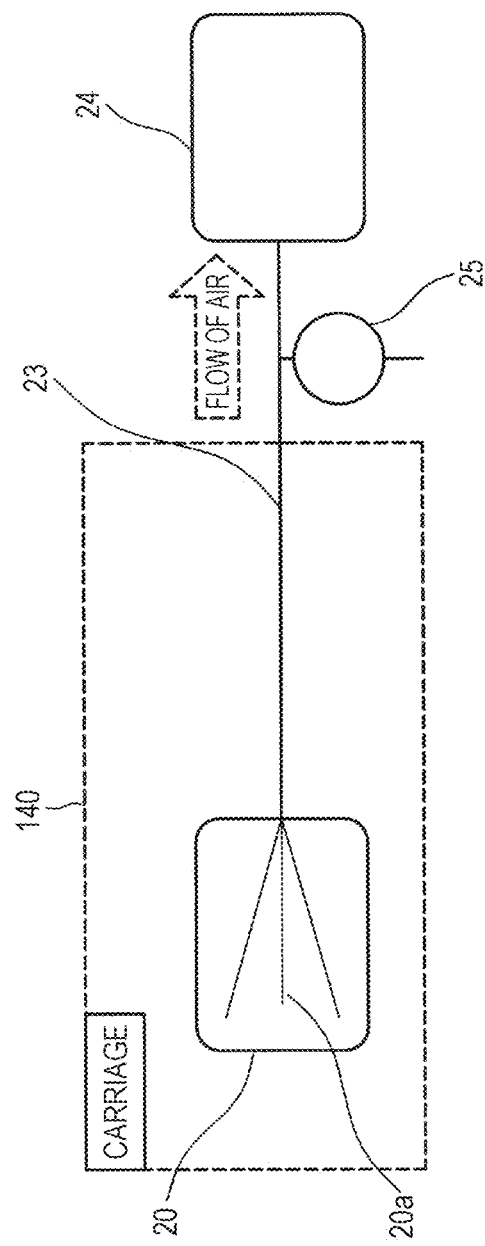

INK-JET IMAGE FORMING DEVICE

CROSS REFERENCE TO RELATED APPLICATIONS

The present application claims priority under 35 U.S.C. § 119 to Japanese patent Application No. 2018-054162, filed on Mar. 22, 2018, is incorporated herein by reference in its entirety.

BACKGROUND

Technological Field

The present invention relates to an ink-jet image forming device.

Description of the Related art

In an ink-jet image forming device that forms an image on a recording medium by ejecting ink from a nozzle of an ink-jet head, if gas dissolved in the ink remains as bubbles in the ink, the ink cannot be ejected to problematically cause an image defect.

In order to prevent this, there is proposed a device in which a degassing unit is provided on an ink supply path for supplying ink from an ink tank to an ink-jet head to degas the ink (for example, JP 2015-058656 A, JP 2011-207017 A, International Publication 2016/098536, and International Publication 2015/125521).

When degassing the ink, a pump common to respective colors arranged in a fixed manner and a degassing unit including a gas-permeable hollow fiber in a carriage are arranged, and the pump and the degassing unit are connected with a tube. A space with hollow fibers inside the degassing unit is filled with ink, and by making a vacuum inside the hollow fiber by generating a negative pressure by the pump, air is extracted from the ink by numerous small holes provided on the hollow fiber and the ink is degassed.

However, from the numerous small holes of the hollow fiber, not only air but also monomers and gels which are components of the ink having a small particle diameter flow out with a certain probability. Herein, the gel has a property of increasing viscosity at a low temperature, and while this is in the ink, this is at a melting temperature of the ink (for example, approximately 80° C.), but when this flows out and passes through the tube, the gel viscosity increases because the temperature decreases in the tube, and the monomer including the gel blocks the tube, so that the vacuum in the hollow fiber cannot be maintained and a degassing function is lost. For this reason, it is necessary to periodically clean the tube, which is very troublesome and causes an increase in down time of the machine.

In JP 2015-058656 A, JP 2011-207017 A, International Publication 2016/098536, and International Publication 2015/125521, the technology of detecting the ink leaked out of the degassing unit and preventing inflow of the ink to the vacuum pump is disclosed; however, a disadvantage occurring by constant inflow of the monomer and gel from the degassing unit is not posed as a problem, and no solution for this advantage is disclosed.

SUMMARY

The present invention is achieved in view of the above circumstances, and an object thereof is to provide an ink-jet image forming device capable of preventing blockage of a vacuum path or the like by storing an inflow flowing into a vacuum path of ink and removing the same from the vacuum path.

To achieve the abovementioned object, according to an aspect of the present invention, an ink-jet image forming device reflecting one aspect of the present invention comprises: an ink flow path; a degassing unit provided in the middle of the ink flow path including a gas-permeable degassing membrane one surface of which is brought into contact with ink in the ink flow path; a vacuum sucker that evacuates the degassing unit; and a vacuum path connecting the vacuum sucker and the degassing unit, wherein the vacuum path is arranged so as to evacuate on a surface side opposite to a surface side brought into contact with the ink of the degassing membrane in the degassing unit, a storage space for storing an inflow flowing into the degassing membrane and the vacuum path is included in the middle of the vacuum path, and the storage space may be maintained at a raised temperature by a heat source.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a view illustrating conventional degassing unit and vacuum path.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
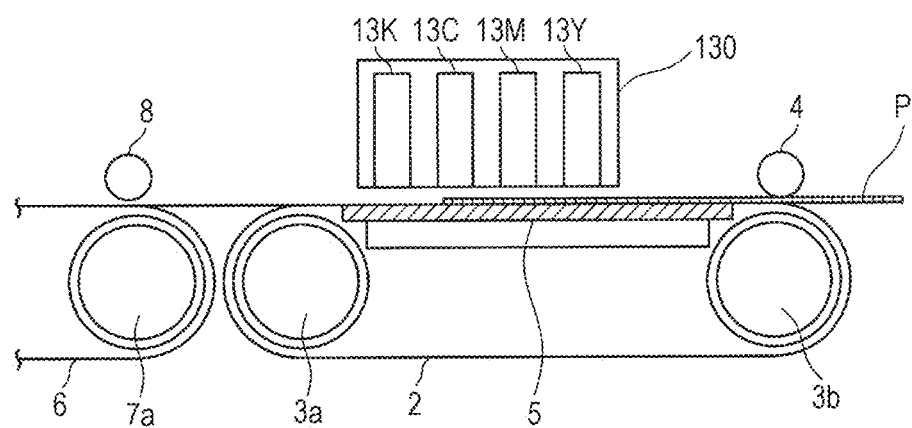
FIG. 1 is a view illustrating a configuration of conveying a recording medium and forming an image in an ink-jet image forming device according to an embodiment of the present invention.

FIG. 1 is a view illustrating a side surface on a conveying path of a recording medium such as paper.

A sheet on which ink is recorded is conveyed by an endless conveying belt 2, herein, for example, a steel belt and the like. The conveying belt 2 is stretched between a driving roller 3a and a driven roller 3b and circles to operate. In a section in which the conveying belt 2 horizontally moves with an outer peripheral side surface (placement surface of a recording medium P) faces upward, the recording medium P to be conveyed is placed on the placement surface to be conveyed along with round movement of the conveying belt 2 while being pressed by a pressing roller 4. At that time, the recording medium P is attracted to a conveying surface by suction of a suction unit 5 and is prevented from floating.

A carriage 130 provided with a head unit is configured to move to a predetermined position at the time of printing and maintenance. At the time of printing, in a section in which the recording medium is conveyed, the recording medium P and the conveying belt 2 face a surface (ink ejecting surface) on which ink is ejected from a nozzle of each head unit of 13Y (yellow), 13M (magenta), 13C (cyan), and 13K (black) of the carriage 130. The ink is supplied to each head unit, and the ink ejected from the head unit hits the recording medium and is conveyed to a fixer side not illustrated by a subsequent conveying belt 6. The conveying belt 6 is stretched between a driving roller not illustrated and a driven roller 7a by which the recording medium P is conveyed while being pressed against a conveying surface thereof by a pressing roller 8.

Figure 2:
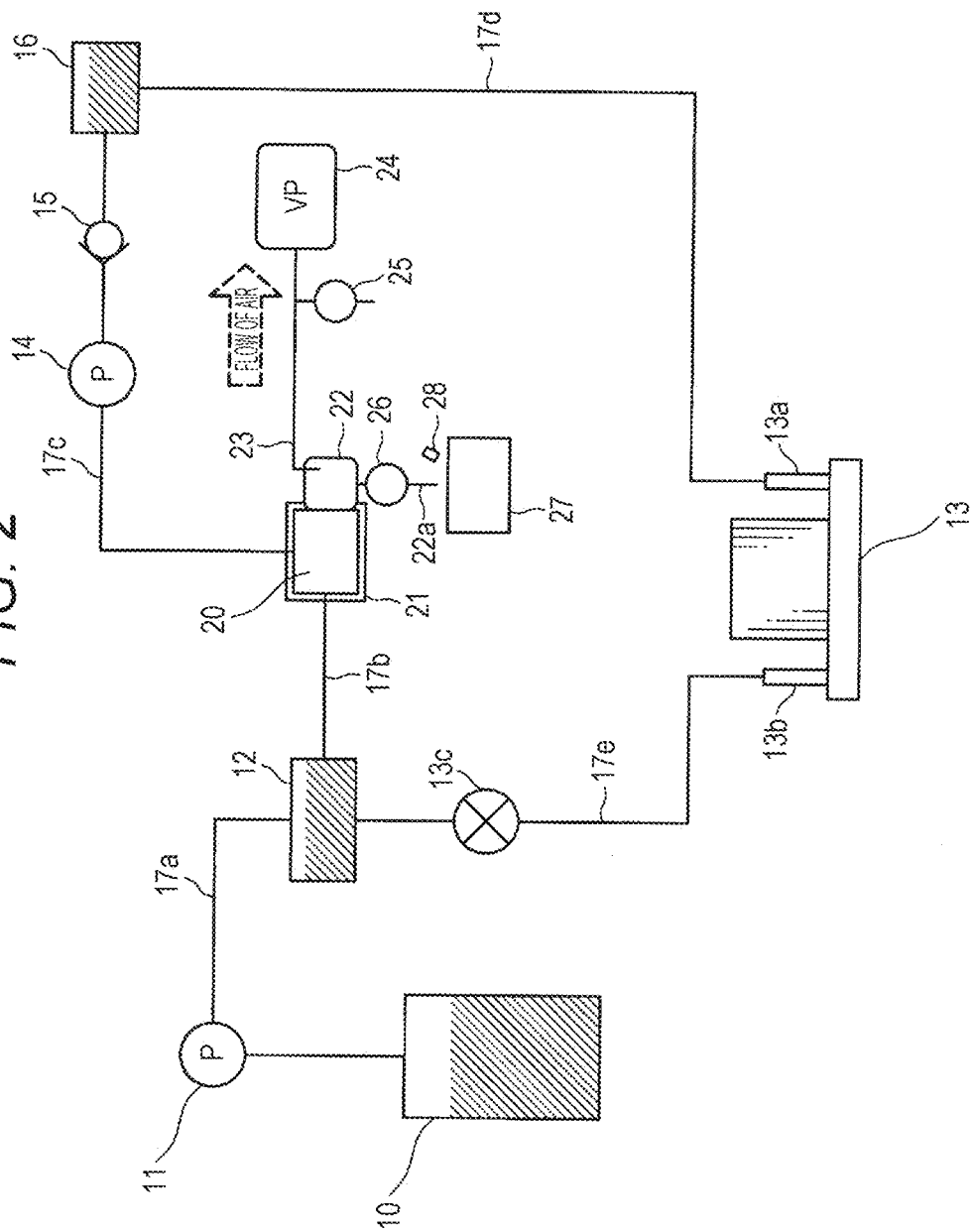
FIG. 2 is a view illustrating a path of ink as well.

Next, a path of the ink supplied to each head unit is described with reference to FIG. 2.

Note that, paths are formed according to the colors of the respective head units, and in the following description, the colors are collectively described.

An ink flow path 17a is connected to an ink tank 10 in which the ink is accommodated, and the ink flow path 17a is connected to a first sub tank 12 via a supply pump 11. An ink flow path 17b is connected to an output destination of the first sub tank 12, and a degassing unit 20 is connected to the ink flow path 17b. The degassing unit 20 is to be described later in detail.

An ink flow path 17c is connected to a liquid output side of the degassing unit 20. A second sub tank 16 is connected to the ink flow path 17c via a liquid supply pump 14 and a check valve 15. An ink flow path 17d is connected to an ink supply side of the second sub tank, the ink flow path 17d is connected to an inlet 13a of the head unit 13, and the ink corresponding to an ink amount ejected from the nozzle is supplied to the head unit 13.

Also, a recovery path 17e is connected to an outlet 13b of the head unit 13 and is connected to a liquid input side of the first sub tank 12 via a valve 13c.

The degassing unit 20 is covered with a heater 21, and a vacuum path 23 is connected to the degassing unit 20. A storage space 22 formed of a tank is interposed in the vacuum path 23, and the storage space 22 is directly attached to the degassing unit 20. A tip end side of the vacuum path 23 is connected to a vacuum pump 24. In the vacuum path 23, a pressure release valve 25 is provided on a path branched on an upstream side of the vacuum pump 24. The vacuum pump 24 corresponds to a vacuum sucker of the present invention. The vacuum path 23 extends out of the carriage 130, and the vacuum pump 24 is arranged in a fixed position outside the carriage 130.

Note that, the storage space 22 is directly attached to the degassing unit 20, and may be maintained at a raised temperature by the heater 21. Therefore, in this embodiment, the heater 21 serves as a heat source of the present invention. In the present invention, the storage space 22 may be installed in a position away from the degassing unit, but this is desirably located in a position as close to the degassing unit as possible. As the heat source, radiation heat from the heater 21 may be used, but a heat source for heating the storage space side may be separately provided.

The degassing unit 20 and the storage space 22 are directly attached, but on an upstream side of the storage space, a path structure may be made different from that of the vacuum path 23 on a downstream side of the storage space 22. For example, a path hole may be provided on a wall portion of the degassing unit 20 to form a part of the vacuum path 23. Also, when the vacuum path 23 between the degassing unit 20 and the storage space 22 has a path structure different from that of the vacuum path 23 on the downstream side of the storage space 22, a flow path cross-sectional area of the vacuum path 23 between the degassing unit 20 and the storage space 22 may be made larger than a flow path cross-sectional area of the vacuum path 23 on the downstream side of the storage space 22. This makes blockage by an inflow flowing from the degassing unit 20 difficult. Also, the vacuum path 23 between the degassing unit 20 and the storage space 22 is desirably maintained at the raised temperature as is the case with the storage space 22 by heating from the heat source.

Also, a discharge pipe 22a is connected to a bottom of the storage space 22, and an open valve 26 is interposed in the discharge pipe 22a. Belt-like cleaning cloth 27 is arranged below a discharge port of the discharge pipe 22a, and the cleaning cloth 27 may clean the inflow discharged from the discharge port. The cleaning cloth corresponds to a cleaner of the present invention. A configuration of the cleaner is not limited to cloth-like one. There is a sensor 28 for detecting a coloring matter of the inflow adhering to the cleaning cloth 27 by cleaning, so that this may perform a coloring matter inspection of the inflow.

Note that, when the carriage 130 moves to the maintenance position, by configuring such that the cleaning cloth 27 is located in a position to clean a head surface of the head unit, the cleaning cloth 27 may perform both cleaning of the head surface and cleaning of the discharge port of the discharge pipe 22a.

Figure 3:
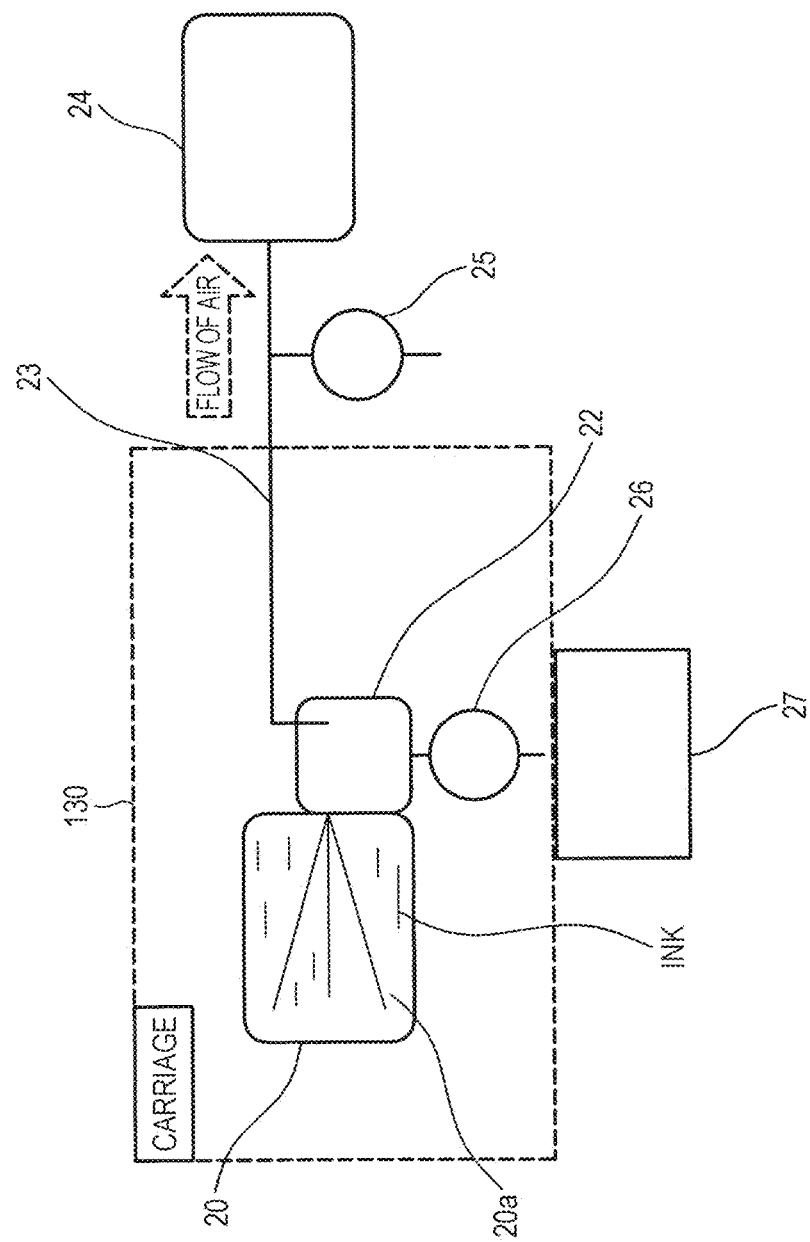
FIG. 3 is a view illustrating a degassing unit and a vacuum path as well.
Figure 4:
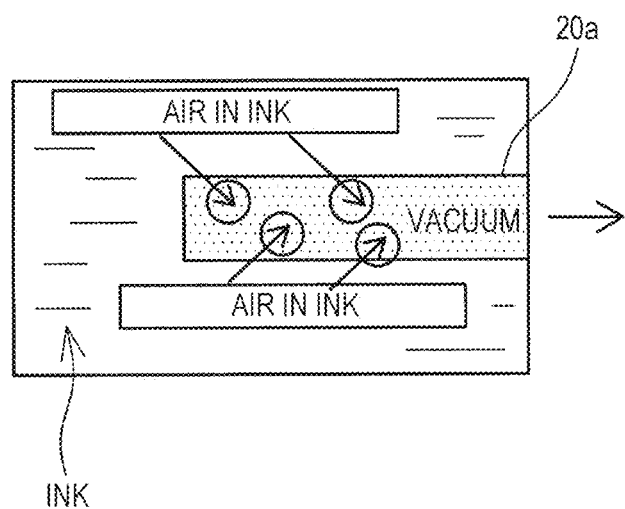
FIG. 4 is an enlarged explanatory view of a hollow fiber portion as well.

Next, a configuration of the degassing unit and the vacuum path is described with reference to FIG. 3 and FIG. 4.

In the carriage 130, the degassing unit 20 is provided.

The degassing unit 20 is formed, for example, into a cylindrical shape, removes (degases) dissolved gas in the ink which flows in, and discharges the degassed ink. As illustrated in FIG. 3, in the degassing unit 20, a large number of hollow fiber membranes 20a are arranged.

The hollow fiber membranes 20a have a large number of hollow fine fiber structures closed at one end with a membrane surface having gas permeability. The vacuum path 23 is connected to the other end of the fine fiber structure of the hollow fiber membrane 20a, and the atmosphere is sucked by the vacuum pump 24, so that the atmospheric pressure is reduced. In this state, the ink is brought into contact with the membrane surface of the hollow fiber membrane 20a, so that only the dissolved gas in the ink selectively permeates through the membrane surface to degas the ink, as illustrated in FIG. 4. The dissolved gas passing through the hollow fiber membrane 20a passes through the storage space 22, and the gas is attracted to a further downstream side through the vacuum path 23.

Next, the details and operation of the ink supply path are described with reference to the attached drawings.

The ink pumped out of the ink tank 10 by the supply pump 11 is supplied to the head unit 13 via the ink flow paths 17a, 17b, 17c, and 17d. It is configured that ink which is not ejected by each head unit 13 may be returned to the recovery path 17e as necessary.

The ink flow paths 17a, 17b, 17c, and 17d are provided with the first sub tank 12, the degassing unit 20, the liquid supply pump 14, the check valve 15, and the second sub tank 16. It is desired that the head unit 13 and the ink flow paths 17a, 17b, 17c and 17d are heated and kept warm by a heating unit such as a heater and a heat transfer member for transferring heat from the heater, so that the temperature of the ink is kept at an appropriate temperature.

Also, the degassing unit 20 includes the vacuum pump 24 for reducing the pressure in the degassing unit 20, the vacuum path 23 connecting the vacuum pump 24 and the degassing unit 20, and the storage space 22 interposed in the vacuum path 23.

The pressure release valve 25 is an electromagnetic valve capable of switching the vacuum path 23 between an airtight state and an air open state according to an operation instruction from a control unit or the like.

The first sub tank 12 is an ink chamber having a small volume for storing the ink pumped out of the ink tank 10 by the supply pump 11.

The liquid supply pump 14 delivers the ink flowing out of an ink outlet of the degassing unit 20 to the second sub tank 16. The check valve 15 is provided between the liquid supply pump 14 and the second sub tank 16 and prevents the ink once delivered to the second sub tank 16 from flowing back.

The second sub tank 16 is a small ink chamber in which the ink degassed by the degassing unit 20 is temporarily stored.

The ink of the second sub tank 16 is connected to the inlet 13a of the head unit 13, and the ink corresponding to the ink amount ejected from the nozzle is supplied to the head unit 13. The ink which is not ejected from the nozzle of the head unit 13 may be returned from the outlet 13b to the first sub tank 12 via the recovery path 17e and the valve 13c. For example, when it is necessary to remove the ink from the ink flow path at the time of maintenance of the head unit 13 or the like, by opening the valve 13c, it is possible to recover the ink of the head unit 13 without discarding.

Next, before describing degassing of the ink in this embodiment, for comparison, degassing in a conventional device is described with reference to FIG. 5.

A carriage 140 in the conventional device includes the degassing unit 20 and the hollow fiber membrane 20a is arranged in the degassing unit 20 as in this embodiment. The vacuum path 23 is connected to a hollow portion side of the hollow fiber membrane 20a, and the vacuum path 23 is directly connected to the vacuum pump 24. The pressure release valve 25 is provided in the vacuum path 23.

In this example, when the degassing is performed by the degassing unit 20, a monomer or a gel having a small particle diameter in the ink enters and moves through the vacuum path 23. Although the ink is heated to a predetermined temperature, for example, approximately 80° C., the temperature decreases as this moves in the vacuum path 23 and blocks the vacuum path, it is not possible to generate a sufficient negative pressure in the degassing unit and a degassing performance is lowered. In order to avoid this, it is necessary to clean or replace the vacuum path 23.

Next, the degassing of the present invention is described.

In the degassing unit 20, the degassing is performed by the hollow fiber membrane 20a as in the conventional case, and degassed air passes through the vacuum path 23 to be sucked by the vacuum pump 24. In the present invention, although the monomer and gel that pass through the hollow fiber membrane 20a with a certain probability temporarily move by the vacuum path 23, they are gas-liquid separated by the storage space 22. The storage space 22 is kept heated at a temperature equivalent to that in the degassing unit 20, for example, by the heat source in which a liquid state without solidification of the monomer and the gel is kept, and blockage of the vacuum path 23 is prevented. Also, since the storage space 22 is attached to or arranged in proximity to the degassing unit, the path from the degassing unit to the storage space is in contact with or arranged in proximity to the heat source and maintained at a high temperature for maintaining high viscosity of the monomer or the like as a stored object low.

Herein, the heat source in the present invention may include a heater and the like, for example. Note that, since the temperature of the degassing unit is also made high because it is required to melt the ink, the degassing unit may be used as the heat source, and high temperature ink may be used as the heat source. In addition, proximity is intended to mean that it is arranged to be heated by the heat source so as not to increase the viscosity of the monomer or the like.

The degassed air from which the monomer and the gel are separated is sucked by the vacuum path 23 on the downstream side beyond the storage space 22 and discharged by the vacuum pump 24.

In the storage space 22, a stored amount of the monomer and the gel gradually increases, so that this may be discarded. Upon discarding, the vacuum pump 24 is stopped, the pressure release valve 25 is opened to return the inside of the storage space 22 to the atmosphere, and furthermore, by opening the open valve 26, the inflow stored in the storage space 22 moves to the discharge pipe 22a by gravity to be discharged to the outside from the discharge port. At that time, since the monomer or the like is maintained at a high temperature, its viscosity is low, so that this may be easily discharged. After closing the open valve 26 after the stored object is discharged, the discharge port may be cleaned with the cleaning cloth 27 to prevent droplets from dripping from the discharge port, and at the same time, the coloring matter of the discharged inflow may be detected by the sensor 28.

According to this embodiment, by eliminating troublesome cleaning work, downtime of the machine is reduced.

Note that, the ink might leak from the hollow fiber membrane due to usage beyond endurance or accidental cause, and a degassing module of each color usually includes a sensor which detects the leakage of the ink; however, by discharging to the cleaning cloth, the ink adheres to the cleaning cloth when the ink leaks, so that it is possible to reduce the number of leak detecting sensor which is heretofore required one for each color to one by providing the sensor which detects that the ink adheres to the cleaning cloth.

The degassing unit 20 which may be made replaceable may be replaced easily by taking the durability and the like into consideration, and at that time, the degassing unit 20 including the storage space 22 may be integrally replaced. It is desirable to design the capacity and the like so that a time in which the storage space 22 is filled with the inflow is equal to or longer than a replacing time period of the degassing unit 20. As a result, it is not necessary to frequently perform the work of discharging the stored objects in the storage space. If it is possible to discharge the stored object in the storage space or replace the storage space at the same time as the replacement of the degassing unit and the like, it is not necessary to separately perform the respective operations, so that down time of the ink-jet image forming device may be reduced.

Although the present invention is described above based on the above-described embodiments, appropriate modification of the embodiment may be made without departing from the scope of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An ink-jet image forming device comprising:
   an ink flow path;

a degassing unit provided in the middle of the ink flow path including a gas-permeable degassing membrane one surface of which is brought into contact with ink in the ink flow path;

a vacuum sucker that evacuates the degassing unit; and a vacuum path connecting the vacuum sucker and the degassing unit, wherein the vacuum path is arranged so as to evacuate on a surface side opposite to a surface side brought into contact with the ink of the degassing membrane in the degassing unit, a storage space for storing an inflow flowing into the degassing membrane and the vacuum path is included in the middle of the vacuum path, and the storage space may be maintained at a raised temperature by a heat source.

2. The ink-jet image forming device according to claim 1, wherein the heat source heats the storage space by heat transfer to the storage space or radiation heat.

3. The ink-jet image forming device according to claim 1, wherein the heat source is used for melting the ink in the degassing unit.

4. The ink-jet image forming device according to claim 1, wherein the vacuum path has a larger flow path cross-sectional area on an upstream side of the degassing unit than on a downstream side of the degassing unit.

5. The ink-jet image forming device according to claim 1, comprising: a pressure release valve that releases a pressure in the storage space, capable of discharging the inflow stored in the storage space when the pressure release valve is opened.

6. The ink-jet image forming device according to claim 5, comprising: a discharge port through which the inflow is discharged, and a cleaner that cleans the inflow discharged from the discharge port.

7. The ink-jet image forming device according to claim 6, wherein a discharge destination of the inflow is the cleaner.

8. The ink-jet image forming device according to claim 6, wherein the cleaner is brought into contact with a head surface of an ink head to clean the ink adhering to the head surface.

9. The ink-jet image forming device according to claim 8, wherein the cleaner is used for cleaning the inflow at the same place as the place used for cleaning the head surface.

10. The ink-jet image forming device according to claim 6, comprising: a sensor that detects a coloring matter of the inflow discharged to the cleaner.

11. The ink-jet image forming device according to claim 1, wherein a period during which the storage space is filled with the inflow is equal to or longer than a lifetime of the degassing unit.

12. The ink-jet image forming device according to claim 11, wherein the degassing unit and the storage space are integrally replaceable.

13. The ink-jet image forming device according to claim 1, wherein the storage space is detachable from the degassing unit.

14. The ink-jet image forming device according to claim 1, wherein the inflow stored in the storage space is one of ink components viscosity of which decreases at a temperature lower than an ink service temperature.

* * * * *